(12) United States Patent
Niklasson

(10) Patent No.: US 7,260,110 B2
(45) Date of Patent: Aug. 21, 2007

(54) METHOD AND SYSTEM FOR EXCHANGING INFORMATION BETWEEN COMMUNICATION NETWORKS

(76) Inventor: Sven Niklasson, Diekstraat 5, 25870 Norderfriedrichskoog (DE)

( * ) Notice: Subject to any disclaimer, the term of this patent is extended or adjusted under 35 U.S.C. 154(b) by 962 days.

(21) Appl. No.: 10/381,387

(22) PCT Filed: Sep. 25, 2001

(86) PCT No.: PCT/EP01/11088

§ 371 (c)(1),
(2), (4) Date: Mar. 25, 2003

(87) PCT Pub. No.: WO02/25875

PCT Pub. Date: Mar. 28, 2002

(65) Prior Publication Data

US 2003/0179772 A1    Sep. 25, 2003

(30) Foreign Application Priority Data

Sep. 25, 2000  (DE) ........................... 200 16 625 U

(51) Int. Cl.
*H04J 3/16* (2006.01)
(52) U.S. Cl. ...................................... 370/466; 370/252
(58) Field of Classification Search .................... None
See application file for complete search history.

(56) References Cited

U.S. PATENT DOCUMENTS 5,873,030 A    2/1999  Mechling
6,967,956 B1 *  11/2005  Tinsley et al. ............... 370/466
7,075,918 B1 *  7/2006  Kung et al. .................. 370/352

FOREIGN PATENT DOCUMENTS

| DE | 295 11 856 U | 11/1995 |
|----|--------------|---------|
| EP | 0 821 507 A | 1/1998 |
| WO | WO98 19438 A | 5/1998 |
| WO | WO98 47270 A | 10/1998 |
| WO | WO99 14910 A | 3/1999 |
| WO | WO 00 07403 A | 2/2000 |

OTHER PUBLICATIONS

Brasche G., et al., *Concepts, Services, and Protocols of the New GSM Phase 2+ General Packet Radio Service*, IEEE Communications Magazine, IEEE Services Center, Piscataway, NJ, U.S., vol. 35, No. 8, Aug. 1, 1997, pp. 94-104; XP000704443.

(Continued)

*Primary Examiner*—Bob A. Phunkulh
(74) *Attorney, Agent, or Firm*—Akerman Senterfitt

(57) ABSTRACT

The invention relates to a method and a system (700) for exchanging information between a plurality of communication networks. The system is especially characterised by at least one data transmission unit (310, 320, 330) for receiving information from at least one source communication network and converting the information into an intra-system data format; at least one first switching unit (410) for transmitting the information received by a data transmission unit (310, 320, 330) to a pre-determined service processing unit (510); in addition to at least one second switching unit (420) for transmitting the information received by one of the service processing units (510) to a pre-determined data transmission unit (310, 320, 330) for converting the information into a format of the target communication network and sending the information to the target communication network.

10 Claims, 3 Drawing Sheets

OTHER PUBLICATIONS

Wuc-S, et al, *Internet Access for Personal Mobile Equipment in a Wireless Wan Environment*, IEEE Transactions on Consumer Electronics, IEEE Inc., NY, U.S., vol. 43, No. 3, Aug. 1, 1997, pp. 873-878, XP000742574.

* cited by examiner

METHOD AND SYSTEM FOR EXCHANGING INFORMATION BETWEEN COMMUNICATION NETWORKS

CROSS REFERENCE TO RELATED APPLICATION

This application is a national stage of PCT/EP01/11088 filed Sep. 25, 2001 and based upon DE 200 16 625.5 filed Sep. 25, 2000 under the International Convention.

BACKGROUND OF THE INVENTION

1. Field of the Invention

The invention concerns a method and a system for exchange of information and data between communication networks such as for example mobile telephone communication networks, telephone fixed networks, the internet, pure data networks or other networks for speech-based and/or non-speech-based services.

2. Description of the Related Art

The increasing integration of these networks as well as the various services offered over these networks requires seamless, rapid and secure communication also between these networks. In this connection there is a problem that these networks in general are operated using different standards. This concerns not only the data protocol, but rather also the type of addressing of the receiver, the type of accounting of the services utilized by the user, the type and the format of the data as well as in certain cases further specific parameters which are employed by a particular network, which would cause interference or which cannot be interpreted in other networks.

Since, as a result of their different histories as well as their different requirements with respect to their bandwidth, speed, type of transmission, etc., a standardization of these networks cannot even come into consideration, there is a need for different possibilities, with which the information exchange is simplified or, in fact, even made possible at all.

From DE 295 11 856 an example of a system is known, with which an exchange of short information (SMS-messaging) between different mobile communication networks is to be made possible. For this purpose each network is assigned a device, which receives, stores and translates in an information exchange format these short messages from the concerned network and then supplies these to a central information distribution facility, which conveys these messages to the device of a target communication network. There the messages are received, the format is translated to the associated network and it is introduced into the network.

A disadvantage of such a monolithic and centrally organized system is comprised however therein, that in particular for large transmission rates the central switching system is very complex and unwieldy and it is hardly possible with economical effort to carry out a checking or processing of individual exchanged information for example for purposes of accounting. It is a further disadvantage that in the case of an error in the central switching system the connection between the networks can completely collapse.

DE 195 39 406 discloses a process for relaying speech associated information in the form of recognition associated data packets of a mobile communication network to a different communication network. Between these networks, there is a central facility for relaying information, which via a number of logical transmission channels is connected with the source mobile communication network, and via respectively one physical transmission channel is connected with multiple target communication networks. Each logical transmission channel is associated with a service, for the operation of which a service center is provided, which is located in one of the target communication networks. By the association of respectively one recognition to one logical transmission channel on the side of the mobile communication network and the fixed connection of such a channel with a logical transmission channel leading to a different target network within the concerned physical transmission channel each data packet should be supplied to the desired target network independent of a network specific receiver address. The central facility however has the same disadvantages, as occur in association with the above discussed messaging system.

Finally from WO 95/33309 a scalable multimedia network is described, which is based on a distributed structure with various hierarchical bus planes, which intends to make it possible for providers of multimedia services to provide in economical manner or supply to a small number of networks and to stepwise build up the capacity with increasing number of users.

SUMMARY OF THE INVENTION

The present invention is thus concerned with the task, of providing a process and a system for information and data exchange between communication networks of the above described type, with which it becomes possible, in relatively simple and reliable manner, to transmit large amounts of information including those of different type between a multiplicity of various structured networks.

This task is solved with a process, which in accordance with Claim 1 is characterized by the following steps: receipt of information (data) from at least one source-communication network as well as conversion of the information into a system internal data format; transmitting the converted information to a particular service processing unit and processing the information in a predetermined manner; converting the processed information in a format of a target communication network as well as switching and transmitting the information to the target communication network.

The task is solved by a system, which in accordance with Claim 2 is characterized by the following features: at least one data transmission unit for receiving information (data) from a source communication network as well as for conversion of the information into a system internal data format; at least one first switching unit for transmitting the information received from a data transmission unit to a predetermined service processing unit; as well as at least a second switching unit for transmitting the information received from one of the service processing units to a predetermined data transmission unit for converting the information into a format of the target communication network and for sending the information to the target communication network.

A particular advantage of this solution is comprised therein, that the system is scalable on the basis of its modular construction, that means, can be stepwise expanded according to the information amount (data volume) to be exchanged, in that additional data transmission units and/or first or as the case may be second switching units and/or service processing units can be added.

In the case that respectively at least two of the mentioned units are present, there exists the possibility that, in the case of a loss of one of the units their function can be taken over by the other unit(s) and thereby a total disruption of the service is avoided.

The dependent Claims relate to further improvements of the invention.

The modular construction of the system makes possible according to Claim 4 also a decentralized arrangement of the units in geographically different locations, so that for example in the case of regional natural catastrophes or a power outage at one location it does not necessarily follow that the entire system collapses and therewith the exchange of information between the networks is interrupted.

BRIEF DESCRIPTION OF THE DRAWINGS

Further details, characteristics and advantages of the invention can be seen from the following description of a preferred embodiment on the basis of figures. There is shown.

DETAILED DESCRIPTION OF THE INVENTION

Figure 1:
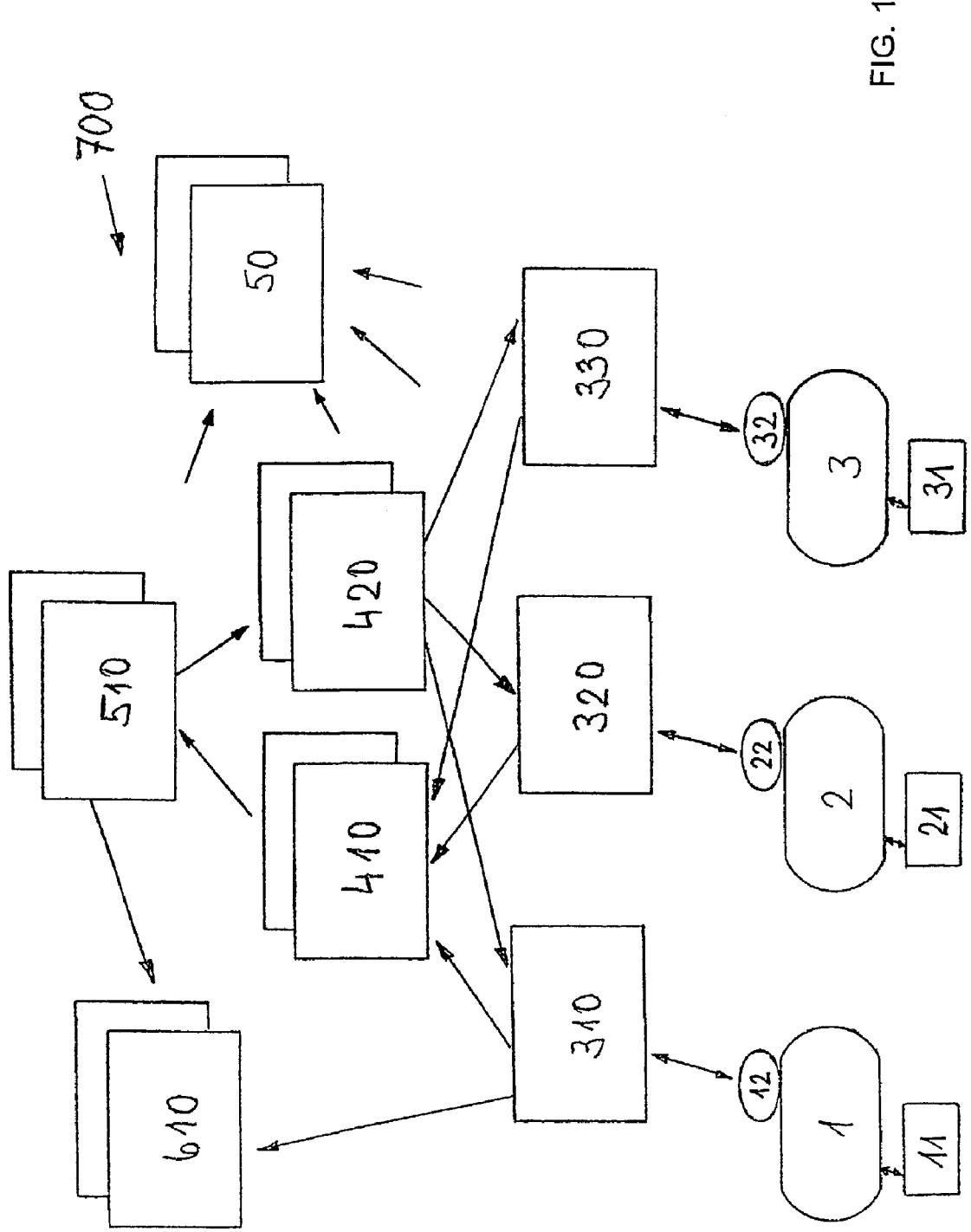
FIG. 1 a schematic representation of such an embodiment in association with multiple networks.

The inventive system 700 is connected with a plurality of communication networks 1, 2, 3 as seen in FIG. 1. For example it can be assumed, that the first communication network 1 is a mobile telephone network, the second communication network 2 a fixed network for telephone and fax transmission and the third communication network 3 is the internet. Beyond this additional and different networks can be provided for respective exchange of various types of speech-associated or non speech-associated information, which likewise can be connected with a system 700.

Among the information which is not speech associated, this includes, besides e-mails, for example written text messages such as the GSM-specific implemented short message service, also know as SMS (short message service) service, for which for one part standardized and for another part non-standardized encoding system exists, that means, different for each mobile radio network.

Each communication network is comprised of a plurality of participants 11, 21 or as the case may be 31, which communicate with each other in known manner within their network 1, 2 or as the case may be 3.

The communication and the information exchange between participants 11, 21, 31 of different communication networks 1, 2, 3 occurs via the system 700. Each communication network 1, 2, 3 is for this purpose connected via respectively one device 12, 22, 32 (communication channel), which serves for receiving, storing and relaying information between the concerned communication network and the system 700 in both directions (bidirectionality).

The communication between the devices 12, 22, 32 on the one hand and the system 700 on the other hand occurs in a data exchange format determined essentially by the concerned communication network 1, 2, 3 via a packet switched data service. For this there can be used connections such as for example native X.25 network, Data-P connection, fixed connections or the internet with the known transmission protocol as well as TCP/IP or frame relay.

The system is therewith in particular suitable for connection of a large number of differently configured communication networks 1, 2, 3, without having to accept a reduction in performance with respect to data throughput of the information to be switched.

The system 700 is comprised of a plurality of functional units 3xx, 4xx, 5xx, 6xx, which are organized and associated modularly and decentralized and respectively satisfy only one particular function. The communication of these functional units with each other and therewith the transmission of the information to be relayed between networks 1, 2, 3 occurs via a system internal (as described in greater detail below) data format, which optionally includes native, optionally optimized, packet oriented communication protocols.

This architecture, in addition, offers the advantage that the system is scalable, that means, that the function units 3xx, 4xx, 5xx, 6xx, depending upon the required capacity, the data volume to be transmitted and/or a desired redundancy, can be provided multiply and it thereby becomes possible that the system is adapted to the actual requirements.

The functional units 3xx, 4xx, 5xx, 6xx can be located in geographically distributed locations. This has the advantage, that the operation of the system is substantially independent from local disturbances and other influence, such as for example in the case of loss of power, data line interruptions as well as disturbances such as fire, water, storm, etc. The communication of the functional units with each other occurs therein via the system internal data format, wherein the same connections can be used, as has been already described above for the communication between the devices 12, 22, 32 on the one hand and the system 700 on the other hand.

In particular the system 700 includes a number of data transmission units (relay units) 310, 320, 330 which form on the one hand a uni- or bi-directional protocol based point-to-point connection with an integrated protocol conversion characteristic and preferably make possible the production of transaction records.

The other side is comprised of the communication network 1, 2, 3, wherein the data transmission units 310, 320, 330 are respectively connected via the devices 12, 22, 32 for receiving, storing and relaying information with respectively one of the communication networks 1, 2, 3.

Further, at least one first router 410 is provided, which serves for connecting the data transmission units 310, 320, 330 with at least one data transmission unit 510. For connecting this data transmission unit 510 in the reverse direction with the data transmission units 310, 320, 330 the system 700 includes further at least one second router 420.

The service processing units 510 respectively include differing services selected by the system operator, which take the form of software modules. The services can respectively correspond with varying data contents, which are supplied by the various communication networks 1, 2, 3 and following processing are again transmitted thereby. Examples of such services include the receipt, the predetermined processing and the relaying of short messages (SMS), e-mails and faxes, on-line banking (for example balance inquires), games, stock market information, data bank questions (map direction information), etc.

The system 700 includes finally also at least one computer unit 610, which communicates both with a data transmission units 310, 320, 330 as well as with the at least one service processing unit 510.

On the basis of an example the function of the system 700 will now be described. For this purpose it is assumed that an information (news) is communicated from a participant 11 of a first (source) communication network 1 to a participant 21 of a second (target) communication network 2.

The information of the participant 11 is supplied within the first communication network 1 with the data format and data protocol used in this first network for the network associated device 12. In this device the information is temporarily stored, in certain cases converted to an exchange format and transmitted to the associated data transmission unit 310 of the system 700.

The data transmission unit 310 receives the information, checks this for any possible transmission errors and produces in the case of an error-free receipt of information a first transaction record with the content "information A from transmitter number 11 to receiver number 21 at time T with identification C received intact". This first transaction record is supplied for accounting purposes to the at least one accounting unit 610. Besides this, the message is converted via the data transmission unit 310 into the system internal data format of the system 700 or as the case may be is appropriately formatted and then transmitted to a first switching unit 410.

In the first switching unit 410 a first switching table is stored, wherein each source communication network 1, 2, 3 is assigned or associated with one of the service processing units 510. This assignment is made independently of information, conditions or other parameters, which can be preset by the system operator. These parameters include for example system internal conditions such as a particular load of the system and/or the transmitter and/or target number and/or a transmission time for the information to be relayed.

The first switching unit 410 transmits following interrogation from the first switching table the information contained in the data transmission unit 310 to the service processing unit 510 indicated in the table. This is carried out in appropriate manner also with the information contained in the other data units 320, 330.

In the selected data units 510 the information is processed and for example checked, whether the transmitting user 11 is registered and whether the appropriate charges can be billed to him. When this checking can be positively concluded, the processing unit 510 produces a second transaction record with a content "transmitter number 11 has requested service D at time T uniquely recognizable by the identification C" and transmits this to the accounting unit 610. As identification C the identification produced by the concerned data transmission unit 310 with the first transaction record is used. Besides this the accounting unit 510 transmits the information to a second switching unit 420.

In the second switching unit 420 respectively one second switching table is stored, in which for each receiver number 11, 21, 31 the data transmission unit 310, 320, 330 of the target communication network 1, 2, 3 assigned at the time is stored, which includes the concerned receiver.

After receipt of the information from the data transmission unit 510, in accordance with the switching table receiver number 21 is interrogated and subsequently the information is relayed to the therein indicated data transmission unit 320 of the target communication network 2.

The data transmission unit 320 converts the information received from the second switching unit 420 out of the system internal data format into the format of the target communication network 2 and transmits the information then to the device 22 associated with this network. From there the information is subsequently supplied via the network 2 to the receiver 21.

Simultaneously the data transmission unit 320 produces in the case of an error-free transmission of information a third transaction record with the content "information A from transmitter number 11 to receiver number 21 at time T with identification C fully transmitted". This third transaction record is then supplied again to the accounting unit 610.

The at least one accounting unit 610 then undertakes on the basis of the three transaction records an appropriate invoicing, that means, produces an invoice and transmits this to the transmitter or receiver or other responsible party for accounting purposes. For this purpose, data with various cost information such as for example fees, etc. is stored in accounting unit 610, which can be attributed individually selectively, that is, to specific transmitters or receivers or other responsible parties.

In the following, for explanation the functional sequence, there will be described first two examples of possible process and data flows. Subsequently, an example one of the data transmission units 310, 320, 330 (switching model) as well as one of the switching units 410, 420 will be described in greater detail.

Figure 2:
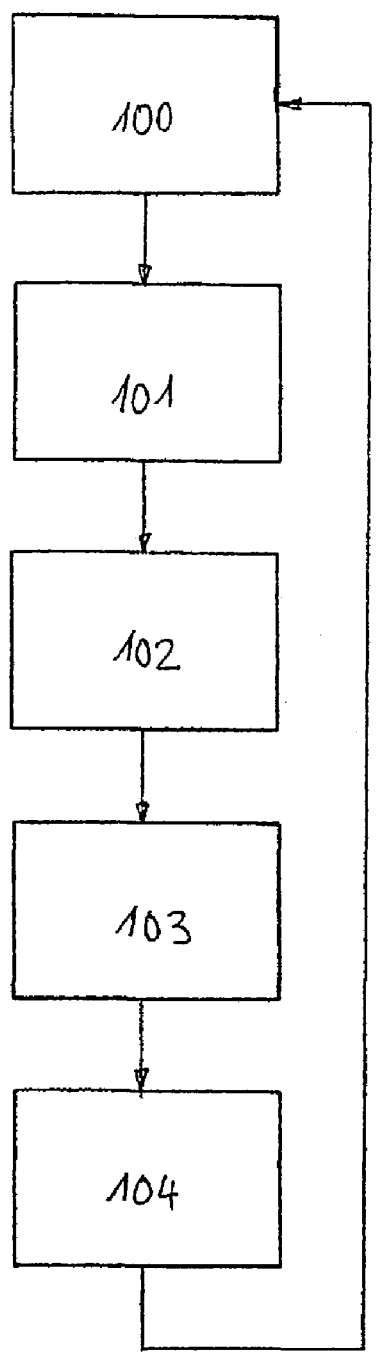
FIG. 2 a flow diagram of a first example for a processing and data flow.

FIG. 2 shows the first example for such a sequence. In a first step 100 the data set is protocol-typically received from one of the communication networks 1, 2, 3 by the data transmission unit 310, 320, 330, which could be located at different geographic origins, according to the above description, by the system 700. Then the concerned data transmission unit 310, 320, 330 checks whether the data set is free of error in accordance with the protocol. If this is the case, then the data set is converted to the system internal data format and stored.

For this purpose multiple possible memory locations (memory devices in various geographic locations) are provided, in which a parameter data is stored and can be selected depending upon the instantaneous load and availability of the system. Only then is the receipt of the data set confirmed to the transmitter by transmission of a suitable message. This process sequence has the advantage, that even if the case of a system interruption generally no data sequence can be lost, since this is stored magnetically in the memory units of the system. Subsequently (for example for accounting purposes) the first transaction record is produced and stored in a memory location (generally one of the accounting units 610) extracted from the parameter data.

In a second step 101 the data set present in the system internal data format is then recorded from the memory unit into one of the first switching units 410. In the switching unit 410 the desired target for the data set, that is, the concerned data processing unit 510, is determined. For this purpose there is used a table with line information present in the parameter data, as well as information contained in the recorded data set such as for example transmitter, receiver, data content, receipt channel information, etc. After determining the responsible service processing unit 510 the data set is further relayed thereto. Non-transmittable data sets are stored in an error memory and can be further processed in desired manner by the system administrator.

In a third step 102 the data set is recorded in the determined signal processing unit 510 and there processed in the above described manner in the contained software module. At the same time a second transaction record is produced, which is stored for accounting purposes in a memory location (in general again one of the accounting units 610) to be extracted from one of the parameter data. The processed data set is subsequently recorded in the system internal data format, wherein possible memory locations can again be extracted from the parameter data. Further, a third transaction record is produced and again stored as described above.

In a fourth step 103 the processed data set is then recorded from the storage unit into the second switching unit 420 and, taking into consideration the instantaneous load and availability of the system unit, is relayed to a desired target communication network 1, 2, 3 and therewith first transmitted to the appropriate data transmission unit 310, 320, 330. The basis for this transmission is a table with line information, from which the parameter data can be extracted, as well as the information contained in the recorded data set.

In a fifth step 104 the data set transmitted by the second switching unit 420 is subsequently recorded in the determined or specified data transmission unit 310, 320, 330, converted out of the system internal data format into the data format of the target communication network 1, 2, 3 and relayed to this network. After receipt of a receipt confirmation transmitted by the appropriate receiver 11, 21, 31 (receipt) the data set is erased from the data transmission unit and then a fourth transaction record is produced and recorded as above, wherein the possible memory locations are again taken from the parameter data. One advantage of this sequence is comprised therein, that the production of duplicate accounting data sets is prevented. Subsequently the sequence can be repeated beginning again with the first step 100.

Figure 3:
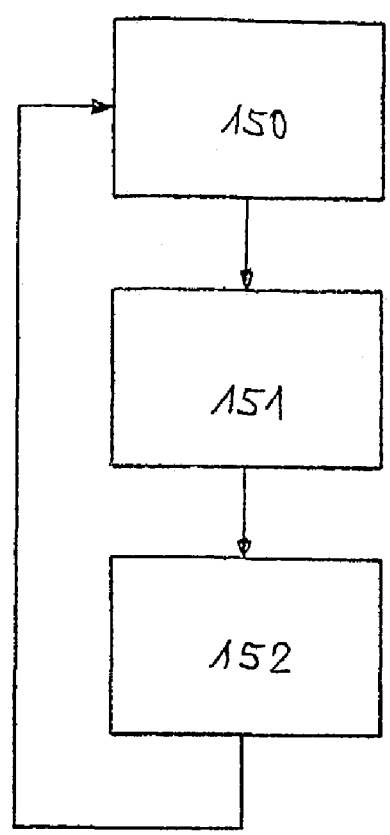
FIG. 3 a flow diagram of a second example for a process and data flow.

A second example begins with the presumption, that in a data processing unit 510 a software module is implemented, with which data sets can be produced asynchronously depending upon an external occurrence. One such software module can be for example for transmission of stock market information, wherein the external event could be for example the exceeding of a limit threshold. In this case in a first step by the service-processing unit 510 in accordance with FIG. 3, a data set is produced for the concerned user and stored in the system internal data format. Then again a first transaction record is produced and as described above is recorded, whereupon the possible memory location for the data set and the transaction record can again be extracted from a parameter data.

In a second step 151 the data set is then transmitted from the memory location into one of the second switching units 420 and recorded therein. On the basis of a table with line information stored in the parameter data as well as information contained in the recorded set then the desired target, that is the appropriate data transmission unit 310, 320, 330 is determined and the data set is transmitted thereto.

In a third step 152 the notified data transmission unit 310, 320, 330 records the data set, converts this to the system internal data format into the data format of the target communication network 1, 2, 3 and transmits this to the target communication network. Following the receipt of a receipt confirmation (receipt of the receiver) transmitted by the target network, the data set is erased from the data transmission unit and then a second transaction record is produced and recorded as described above, wherein the possible recording locations are again extracted from the parameter data. An advantage of this procedural sequence is comprised also herein in that the production of duplicitous accounting data sets is avoided. Subsequently the sequence beginning with step 150 can again be repeated.

It is true in all cases, that for all transaction records two recording locations (accounting units 610) can be provided for simultaneous recording, which could be, for example, physically and geographically separated from each other. This redundant memory is possible due to the assignment of unique identification numbers, with which a double-processing is prevented.

It is further valid, that the various steps (functional segments) described in the two examples can be carried out in respectively geographically differing locations. The connection between the units 3xx, 4xx, 5xx, 6xx required for carrying out the steps occurs either via system internal or other, generally available, communication connections.

If, beyond this, these units can be provided redundantly, there results the advantage, that in the case of loss of some or all units in one geographic location the system can continue to operate without interruption with the other units in the other location.

As has already been described, the processing capacity of the system can be increased by the parallel operation of multiple identical units and therewith in simple manner the capacity can be adapted (scaled).

The transmission of information or as the case may be data sets between various communication networks 1, 2, 3 is made possible on the one hand by the protocol distribution occurring in the data transmission units 310, 320, 330 as well as on the other hand by the use of the system internal individual data formats.

For achieving the above described manner of operation, programs are implemented in the data transmission units 310, 320, 330 (switching modules), which can for example be started multiple times. In order to individualize a started program ("event") to for example with respect to the determined communication line, definition, etc., there is in accordance with FIG. 4a, in a step 200, a parameterization carried out on the basis of a parameter-set, which is indexed by the name of the event, and whereby the above-mentioned parameter data is produced.

Such a started program connects in accordance with step 200 the data transmission unit 310, 320, 330 with a communication channel 12, 22, 32 of a communication network 1, 2, 3 according to the parameterization. According to step 201 it is then interrogated whether the connection has been established without error and in accordance with the protocol. If this is not the case, then in accordance with step 202 an error sequence, for example, in the form of an entry in a log book, an alarm to a system administrator, etc. is carried out and the connection attempt repeated in accordance with step 200. When the connection has been established without error, then in accordance with step 203 the connection to the receiver or address (opposite location) 11, 21, 31 is produced via the concerned communication network 1, 2, 3.

Finally it is interrogated in accordance with step 204 whether the circuit or network monitoring time has elapsed. If this is the case, then in accordance with step 205 an appropriate alarm signal is transmitted to the opposite location. If the circuit monitoring time has not expired, then in accordance with step 206 is interrogated, whether a complete data set has been received by the communication channel. If this is the case, then the process sequence is commenced with a first routine 250. Otherwise in accordance with step 207 it is interrogated, whether a request exists, for transmission of the data set. If this is the case, then the process sequence is carried out with the second routine 260, otherwise a return to step 205 occurs.

Following the running-through of the first or second routine 250; 260 there is in accordance with the step 208 interrogated, whether the monitoring time for this event has expired. If this is the case, then in accordance with step 209 an appropriate status signal is produced and a monitoring monitor 50 ("watchdog") is transmitted. Otherwise, in accordance with step 210 a still available computing time of another processor is made available.

Figures 4A, 4B:
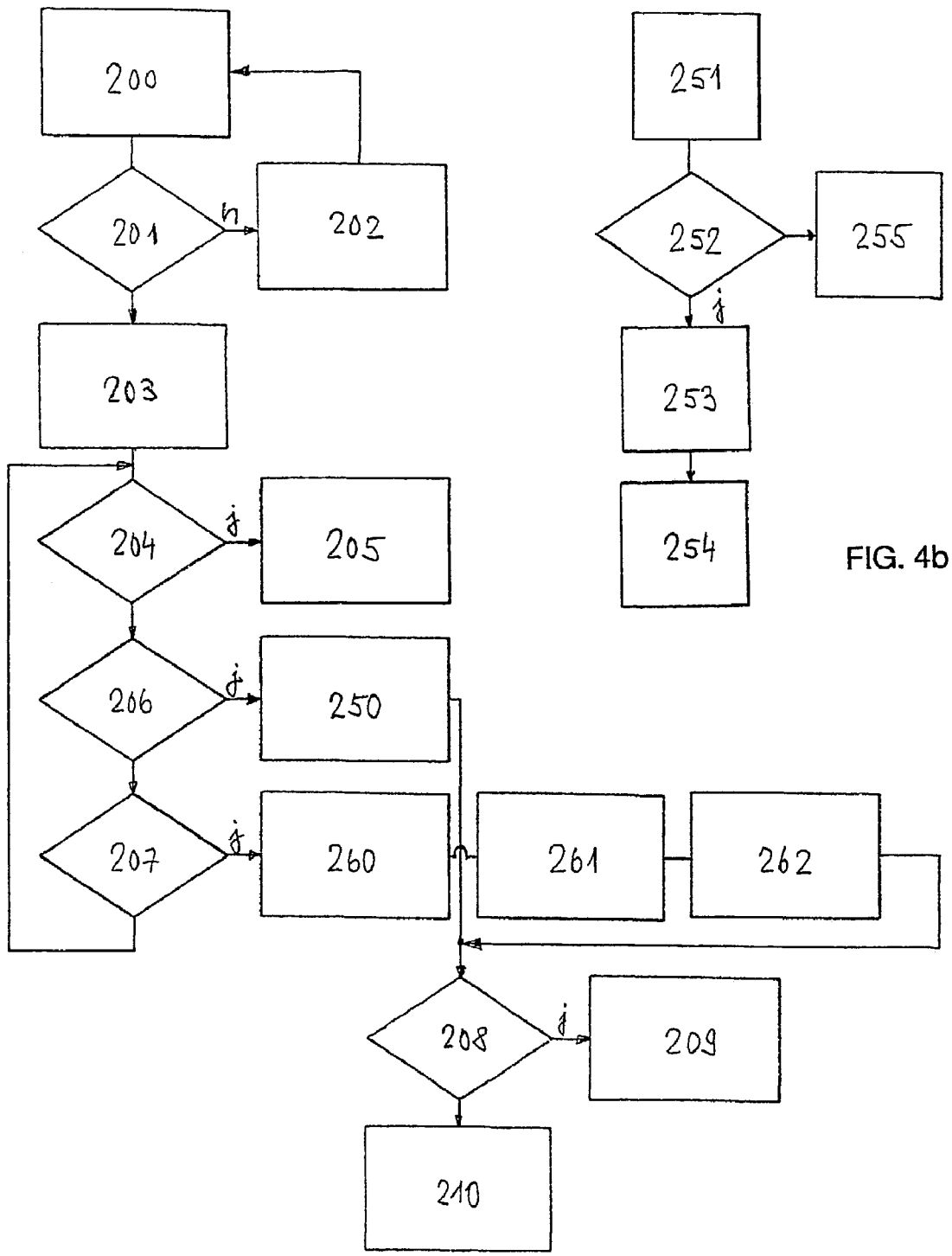
FIGS. 4a, 4b flow diagram of a functional sequence of a data transmission unit.

A flow diagram of the first routine 250, with which the received data set (data framework) is processed, is shown in FIG. 4b. Following checking of the data for possible errors and plausibility in a step 251, there is next checked in step 252 whether the received data is such as to be further relayed via the system (useful data), or whether this is a confirmation (receipt) for a previously transmitted set of data. This question can be decided for example on the basis of an attribute of the data set.

If the received data is useful data, then this is first recorded in accordance with step 253 and translated into the system internal format. Subsequently in accordance with step 254 a receipt confirmation (receipt) is transmitted to the sender of the data set and a first transaction record "data was received" is produced, which for accounting purposes is supplied to the accounting unit 610. Subsequently the process continues with step 208.

If the received data is a receipt confirmation of a receiver 11; 21; 31, then in accordance with step 255 essentially a transaction record "data was transmitted" is produced, which again for accounting purposes is provided to the accounting unit 610. Subsequently the process continues with step 208.

If in accordance with the second routine 260 (FIG. 4a) the data set is to be transmitted, then this is next translated or converted in accordance with step 261 from the system internal data format into the format of the target communication network 1, 2, 3. Subsequently the data set is transmitted in accordance with step 263 and the monitoring device is started, with which the receipt of a receipt confirmation from the receiver 11; 21; 31 is awaited, and then the process continues with step 208.

In the following the basic manner of operation and functioning of the switching units 410, 420 is described. For this first certain general principles are discussed.

Each communication channel 12, 22, 32 of the inventive system is assigned a unique name comprised of five letters or numbers. Further, each communication channel is connected with a switching location within the communication network 1, 2, 3 assigned to it.

Each data set transmitted in the system respectively has a unique name selected from the supply of names, which are made available by the switching units 410, 420 connected with each other decentralized in the system. The name of the data set is comprised of five characters, which are uniquely assigned to the communication channel 12, 22, 32 which the transaction originally caused, which provides for example the receipt channel, as well as a supplemental character identification chain, which provides the transaction time (transmission or receiver) with date and clock time to the millisecond. Further, a unique name description is employed, which identifies the (user) data set as such and for example differs from the termination data set, which is provided with a different name identification.

In this manner, from the name of each data set, there can be extracted the employed communication channel 12, 22, 32 as well as the external communication network 1, 2, 3 inclusive of a switching location in the communication network used therefore and the transaction date and the transaction time. Therewith for each data set a unique identifiability is provided, so that large data banks for determination of this information are unnecessary. Thereby it also becomes possible from the content of the data set to obtain directions ("content-routing including sequencing") as well as run time measurements and a correct following up of the data sets solely on the basis of the name of the data set. In this manner for example short message centers, which are localized in various GSM-networks, can be connected with each other.

Finally, therewith it is also possible to have an intelligent load control or as the case may be load distribution to other switch units depending upon the instantaneous load of individual switching units 410, 420.

In more detail, the data sources connected with one switching unit 410, 420, which involve the data transmission units 310, 320, 330 as well as the data processing units 510, are cyclically interrogated whether a data set to be transmitted is present. This interrogation can occur according to a fixed priority sequence.

If such a data set is located, then the relative data for further relaying is extracted therefrom. This includes for example the transmitter number, the target number, used communication channels, in certain cases text content, if the data set is to be propagated depending upon its content, as well as possible other special information. On the basis of this extracted data, the desired target is determined using a switching table. Further it is to be checked, whether the data set contains a sequence request, that is whether the individual data packets must be received by the receiver in a predetermined sequence. This is for example frequently the case for content dependent relaying. If such a sequence request exists, then the data set is relayed to a predetermined communication channel or as the case may be a communication channel group for this purpose.

Otherwise it is determined, whether another local path to the receiver indicated in the switching table is available and not overloaded. This is determined for example on the basis of a task waiting list, a delivery list as well as by a comparison between a maximal allowable number of tasks. Depending upon this comparison the data set is then either relayed via the local path to the data transmission unit, or it is determined, whether within the system a different path leads to this data transmission unit, which is available and (following carrying out of the mentioned comparison) is not overloaded. If all other paths are not available or are overloaded, then the data set is transmitted to a buffer area and there stored temporarily, in order to be transmitted at a later point in time to the target. A target therein could be either the communication network 1, 2, 3 as well as a service operating in the service processing unit 510.

For monitoring the system 700 as well as for ensuring an even loading or as the case may be an optimal processing speed one or more monitoring monitors 50 (FIG. 1) are provided, which can be evaluated using status reports. Each running program (event), that is, each of the units 3xx, 4xx, 5xx, 6xx, produces at predetermined time intervals, which can be selected by the system administrator, those status reports which contain information regarding the circuit availability, traffic statistics and quality information, such as example the number of successful transmissions and the number of negative reported transmissions, as well as indications regarding the instantaneous load condition, that is the number of the instantaneous tasks still waiting in the waiting list. The status reports are magnetically stored as data in predetermined locations, so that the monitoring monitors (or other evaluation programs) are only coupled loosely to the switching units 410, 420 and by their operation cannot introduce during their operation errors into other program sequences.

The monitoring monitors 50 asynchronously access the stored status reports and prepare the contained information for evaluation by a system administrator, for example, HTML-based graphics, or transmit these as short reports.

This has the advantage, that simultaneously multiple system administrators at different work locations with differing operation systems can work on the system and monitor this. Further, on the basis of limitations (limitation parameters) it can be determined, whether this system or as the case may be individual running programs are reaching a critical condition and for example are no longer active within the predetermined timeframe ("Watch Dog"—process, dead man switch).

Finally there is the possibility of a remote monitoring of one or more of the monitoring monitors 50 by a supervision software, if this is installed for example on a physically and geographically independent system (separate computer, notebook), which is provided with a mobile telephone as well as a device, via which a monitoring person can independently call up from a remote location using a telephone network. The supervisor software checks in regular time intervals the status reports of the monitoring monitor 50. If errors occur in such a report, or the exceeding of a threshold value is indicated, or within a predetermined time interval it is not received, then automatically the remote location is dialed up and an appropriate predetermined message is transmitted to the monitoring person.

The invention claimed is:

1. A process for information and data exchange between a plurality of communication networks, comprising the following steps:
   receiving information (data) from at least one source communication network, converting the information into an intra-system data format, and producing and recording a first transaction record including the receipt of the information (data);
   transmitting the converted information via one of at least two available first switching units to a pre-determined service processing unit, processing the information in a predetermined manner, and producing and storing a second transaction record including the requesting of the service processing unit;
   transmitting the processed information via one of at least two available second switching units to data transmission unit associated with the target communication network, converting the information into a format of the target communication network, transmitting the information to the target communication network and producing and storing a third transaction record including the transmission of the information to the target communication network; and
   calculating an invoice of charges on the basis of the transaction records.

2. A process according to claim 1, wherein:
   the first transaction record includes at least one indication regarding the transmitter, the receiver and an identifier,
   the second transaction record contains at least one indication regarding the transmitter, the requested service, and an identifier
   the third transaction record includes at least one indication regarding the transmitter, the receiver and the identifier.

3. A system for information and data exchange between a plurality of communication networks comprising:
   at least two data transmission units (310, 320, 330) for receipt of information (data) from at least one source communication network (1, 2, 3), for converting the information into an inter-system data format, and producing and recording a first transaction record including the receipt of the information;
   at least two service processing units (510) for processing the information according to a selected service, as well as for producing and storing a second transaction record including the requesting of the service processing unit,
   at least two first switching units (410) for transmission of the information received by the data transmission unit (310, 320, 330) to one of at least two service processing units (510); as well as
   at least two second switching units (420) for transmission of the information received by said one of the data transmission units (510) to a predetermined data processing unit (310, 320, 330) which is adapted for conversation of the information into a format of the target communication network (1, 2, 3), for sending the information to the target communication network, and producing and storing a third transaction record including the transmission of the information to the target communication network;
   at least two accounting units (610) for producing an invoice on the basis of the transaction record following a transmission of information from a source communication network to a target communication network and for assigning the invoice to a transmitter or receiver or other party accountable for the transmission for purposes of billing.

4. A system according to claim 3, wherein at least two data transmission units (310, 320, 330) is designed as one side of a uni or bi-directional, protocol based point-to-point connection with an integrated protocol conversation characteristic and preferably additional transaction record generation.

5. A system according to claim 3, wherein the units (3xx, 4xx, 5xx) are organized decentralized and at least a part of the units is provided in geographically different locations, wherein the information between the units is exchanged with the system internal data format.

6. A system according to claim 3, wherein in the at least two first switching units (410) a first switching table is stored, with which each receiver is associated with one of the data processing units (510), wherein this association occurs depending upon information, conditions or other parameters, which the system administrator can establish.

7. A system according to claim 2, wherein in the at least two second switching units (420) a second switching table is stored, in which for each receiver the at the time associated data transmission unit (310, 320, 330) of the target communication network (1, 2, 3) is stored.

8. A system according to claim 3, wherein at least one unit (12, 22, 32) for receiving, storing and relaying information between a communication network and an associated data transmission unit (310, 320, 330).

9. A system according to claim 8, wherein the device (12, 22, 32) for receiving, recording and relaying information is connected with the data transmission unit (310, 320, 330) via a packet relaying data service.

10. A system according to claim 3, wherein at least two service processing units (510) include software modules, with which the services can accomplish the processing and relaying of short messages (SMS), E-mails and faxes, online banking, games, stock market information, and data bank inquiries.

* * * * *